US006532830B1

(12) United States Patent
Jansen et al.

(10) Patent No.: US 6,532,830 B1
(45) Date of Patent: Mar. 18, 2003

(54) HIGH PAYLOAD SIX-AXIS LOAD SENSOR

(75) Inventors: John F. Jansen, Knoxville, TN (US); Randall F. Lind, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/399,479

(22) Filed: Sep. 20, 1999

(51) Int. Cl.$^7$ ................................................. G01D 7/00
(52) U.S. Cl. ................................................. 73/862.042
(58) Field of Search ........................ 73/862.042, 862.66, 73/862.043, 862.04, 88.5 R, 113 R, 133, 862.044; 310/373 R; 345/161; 177/211, 134; 128/777

(56) References Cited

U.S. PATENT DOCUMENTS

| | | | |
|---|---|---|---|
| 3,618,376 A | | 11/1971 | Shull et al. |
| 3,640,130 A | | 2/1972 | Spescha et al. |
| 3,956,930 A | | 5/1976 | Shoberg |
| 3,960,456 A | * | 6/1976 | Norris ........................ 403/27 |
| 4,094,192 A | | 6/1978 | Watson et al. |
| 4,488,441 A | | 12/1984 | Ramming |
| 4,623,813 A | * | 11/1986 | Naito et al. .............. 310/313 R |
| 5,078,016 A | * | 1/1992 | Russo ....................... 73/862.54 |
| 5,315,882 A | * | 5/1994 | Meyer et al. ........... 73/862.044 |

OTHER PUBLICATIONS

"Measurement and Control," Alexander Yorgiadis, Oct. 1986, pp. 177 and 178.

* cited by examiner

Primary Examiner—Harshad Patel
(74) Attorney, Agent, or Firm—Akerman Senterfitt

(57) ABSTRACT

A repairable high-payload six-axis load sensor includes a table, a base, and at least three shear-pin load transducers removably mounted between the table and the base. Removable mounting permits easy replacement of damaged shear pins. Preferably, the shear-pin load transducers are responsive to shear forces imparted along the two axes perpendicular to an axis of minimum sensitivity characteristic of the transducer. Responsive to an applied shear force, each shear-pin load transducer can produce an electrical signal proportional to the reaction force. The load sensor can further include a structure for receiving the proportional electrical signals and computing the applied load corresponding to the proportional electrical signals. The computed load can be expressed in terms of a three-dimensional XYZ Cartesian coordinate system.

23 Claims, 3 Drawing Sheets

HIGH PAYLOAD SIX-AXIS LOAD SENSOR

This invention was made with government support under contract DE-AC05-96OR22464, awarded by the United States Department of Energy to Lockheed Martin Energy Research Corporation. The United States government has certain rights in this invention.

BACKGROUND OF THE INVENTION

1. Technical Field

This invention relates to the field of load sensors and More particularly to an improved high-payload six-axis load sensor.

2. Description of the Related Art

In automatically controlled systems, and particularly in robotic machinery, it is desirable to monitor the forces and moments being generated at the work site between the motive, or drive power element, and the driven element of the operating unit, frequently referred to as an "arm". Force and moment measurements, and feedback for control in response to such measurements, have heretofore been accomplished by a number of methods. For example, individual axial forces have been measured with a standard moment measuring load transducer.

Load transducers are electromechanical transducers that translate force or weight into voltage. This change in voltage produces, in the read-out instrumentation, a repeatable deflection or indication that can be calibrated directly in terms of the load applied to the load transducer. Construction of the load transducer utilizes all the advantages of bonded foil strain gauges. Sealed within the load transducer are sets of matched strain gauges bonded to a high strength element, machined to close tolerances. The strain gauges are electrically connected to form a balanced Wheatstone bridge. Furthermore, additional compensation resistors are added to the circuit for maintaining the accuracy of the Wheatstone bridge over a wide temperature range. The principle of operation depends upon the deflection of the strain gauge filament, creating a change in its resistance, thereby unbalancing the Wheatstone bridge circuit. As a result, for a given input voltage, the output voltage of the bridge varies proportionally with the load. Consequently, the change can be read on appropriate instrumentation.

For simultaneous measurement of more than one load or moment, single force or single moment load transducers have been assembled with suitable mechanical devices to achieve the required loading measurements. Specifically, one multi-component element can be constructed to measure: multiple loads or moments applied to the multi-component element. When larger sizes or ranges are necessary, a force platform, or table, can be constructed, the table having attached thereto more than one multi-component element. Presently, many such prefabricated systems are commercially available.

For instance, U.S. Pat. No. 3,640,130 issued to Spescha et al. on Feb. 8, 1972 for FORCE AND MOMENT ARRANGEMENTS discloses a measuring unit embodying a plurality of force-measuring load transducers. The Spescha et al. apparatus permits the separation of complicated force and moment effects upon a body to be investigated and maps the same to desired coordinate axes and planes. Spescha et al. note that for the general case, six measuring quantities are required to express a force vector engaging a test point in any spatial relationship. Thus, the six measuring quantities must be measured simultaneously.

In consequence, a condition for reliable performance of such an apparatus is a highly accurate assembly of very rigid measuring load transducers in accordance with the requirements of the desired ordinate directions. Recognizing the need for very rigid measuring transducers, the Spescha et al. device particularly requires each measuring load transducer to be rigidly secured between two plates. However, the rigid construction of the apparatus precludes the low cost maintenance and repair of each measuring load transducer rigidly secured between the two plates. In particular, a poorly performing measuring load transducer cannot easily be replaced with a proper measuring load transducer.

Similar problems exist with other six-axis force-torque sensors. For instance, U.S. Pat. No. 3,956,930 issued to Shoberg on May 18, 1976 for DRIVELINE TORQUE AND/OR THRUST SENSOR discloses a sensor transducer for measuring the torque and thrust forces in a driveline system having a U-type coupling joint. The Shoberg apparatus includes a force transducer having a substantially circular body. Significantly, the thrust gauges are stacked or laminated in pairs on flexure struts incorporated as part of the transducer body. Moreover, torque measuring gauges are laminated on opposite surfaces of the struts. Thus, like the Spescha et al. device, the gauges are permanently incorporated as part of the sensor and cannot easily be removed for repair.

Likewise, U.S. Pat. No. 4,488,441 issued to Ramming et al. on Dec. 18, 1984 for APPARATUS FOR SIMULTANEOUS MEASUREMENT OF MUTUALLY PERPENDICULAR FORCES AND MOMENTS discloses a device suitable for controlling a robot operating arm having a drive linked between a driving member and a driven member which can determine forces and moments acting to resist movement therebetween. The Ramming et al. sensor includes a pair of generally parallel plate or base members which are joined by curved arch segments circumferentially spaced around the periphera of the plates and are normal thereto. As in Shoberg, however, strain gauges are permanently affixed to one or more surfaces of the arch segments. Thus, like the Spescha et al. device, the strain gauges cannot easily be removed for repair.

Finally, U.S. Pat. No. 4,094,192 issued to Watson et al. on Jun. 13, 1978 for METHOD AND APPARATUS FOR SIX DEGREE OF FREEDOM FORCE SENSING discloses a system for processing outputs from strain gauges attached to a structure to derive the desired force and torque components in an orthogonal three-axis coordinate system. Like the Ramming et al. sensor, the device described in Watson et al. includes strain gauges permanently affixed to intermediate sections connecting two force sensing sections. As a result, the strain gauges easily cannot be removed and repaired. Thus, a need exists for a high payload, low cost, repairable six-axis force-torque sensor.

SUMMARY OF THE INVENTION

An improved high-payload six-axis load sensor can comprise: a table for receiving an applied load; a base; and, at least three shear-pin load transducers removeably mounted between the table and the base. Notably, the three shear-pin load transducers can measure reaction forces between the table and the base, the reaction force having been produced by the applied load. Preferably, each shear-pin load transducer is responsive to shear forces imparted along two axes perpendicular to an axis of minimum sensitivity characteristic of the transducer. Responsive to an applied shear force, each shear-pin load transducer can produce an electrical signal proportional to the reaction forces. Thus, the improved high-payload six-axis load sensor can further comprise computing means for receiving the proportional electrical signals and computing the applied load corresponding to the proportional electrical signals. The computing means further can express the computed load in terms of a three-dimensional XYZ Cartesian coordinate system.

Preferably, the shear-pin load transducers are symmetrically mounted in mounting holes about the table. In addition, the table can be a low-profile disc. As such, each of the shear-pin load transducers can be radially positioned apart from each other shear-pin load transducer about a circumference of the disc. In addition, the table can define at least two flexures, each flexure corresponding to a shear-pin load transducer removably mounted between the table and the base. Each flexure can be formed by removing material from the table to form one or more thin beam structures. The number of flexures formed in the table depends on the maximum load anticipated, material employed, and desired stiffness. The present invention incorporates four flexures for each shear-pin load transducer.

In forming each flexure, the flexure preferably can be positioned perpendicular to an axis of minimum sensitivity characteristic of the removeably disposed shear-pin load transducer. In consequence, the flexure can minimize unmeasured axial loading on the shear-pin load transducer. Still, one skilled in the art will recognize that means other than flexures can be employed to prevent axial loading of the shear-pin load transducer. For example, it may be practical to place a low friction sliding coupling along the axis of the shear-pin load transducer.

Each shear-pin load transducer can further include a spherical bearing embedded in the table, the spherical bearing defining a cylindrical passage. In accordance with its design, each spherical bearing can enclose a length of the shear-pin load transducer inserted through the cylindrical passage of the spherical bearing when removeably mounted in the table. Without the spherical bearing, small deflections and distortions in the table caused by a load can cause slight angular misalignment of the mounting holes. The misalignment can cause unequal loading of the shear-pin load transducer along its length which can in turn degrade the accuracy of a resulting measurement. Thus, the spherical bearing can reduce moment loads applied to the shear-pin load transducer, and therefore improve measurement accuracy.

A method for computing an applied load in a high-payload six-axis load sensor having three shear-pin force transducers comprises the steps of first measuring a non-linear output voltage from each strain gauge in each of the three shear-pin force transducers contained in the high-payload six-axis load sensor. Second, the inventive method can transform each non-linear output voltage to a non-linear gauge voltage. Third, for each of the three shear-pin force transducers, the method can linearize the measured non-linear voltages, the linearization forming a linear vertical force component and a linear horizontal force component for each of the three shear-pin force transducers. Fourth, for each vertical force component and horizontal force component formed from a measured non-linear voltage, the method can remove pin mounting bias from the vertical force component and the horizontal force component, the removing step forming a modified vertical force component and a modified horizontal force component. Finally, the method can compute an applied load from the modified vertical force components and modified pin horizontal force components.

An improved high-payload six-axis load sensor in accordance with the inventive arrangement satisfies the long-felt need of the prior art by providing a simple, low cost, field repairable six-axis load sensor which is capable of very high payloads. Specifically, the invention can enable heavy-load robotic manipulators that are scalable upward from a 5,000 lbs. force and 5,000 ft-lbs. torque payload capacity to over a 100,000 lbs. force and 100,000 ft-lbs torque capacity. Thus, the inventive arrangements provide a novel design for a six-axis load sensor. The inventive arrangements have advantages over all six-axis load sensors, and provides a low cost, repairable, high capacity, force and torque sensor for measuring the forces and moments applied to a manipulator, machine tool or fixture.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

The present invention pertains to a simple, low cost, field repairable six-axis load sensor capable of very high payloads. In the preferred embodiment, the inventive sensor utilizes commercially available two-axis shear-pin load transducers which can accurately measure forces in two orthogonal axes. The shear-pin load transducers measure reaction forces between an input table and base produced by forces or torques, separately or in combination, applied to the input table. The reaction force measurements are algebraically related to the input forces and torques.

Unlike other load transducers, because shear-pin load transducers both are capable of very high load ranges and can be widely separated on a device, the inventive load sensor is particularly adaptable to higher force and torque ranges which existing systems presently cannot achieve. In addition, the preferred embodiment incorporates features for reducing errors that could be produced by force and moment loading of the shear-pin load transducers in directions that are not measured. Significantly, the invention includes a method for reducing the effects of non-linearities and cross-coupling typically found in the shear-pin load transducers. In consequence, the invention is particularly useful where it is important to measure reaction forces and torques as applied to robots, machine tools and fixtures.

Figure 1:
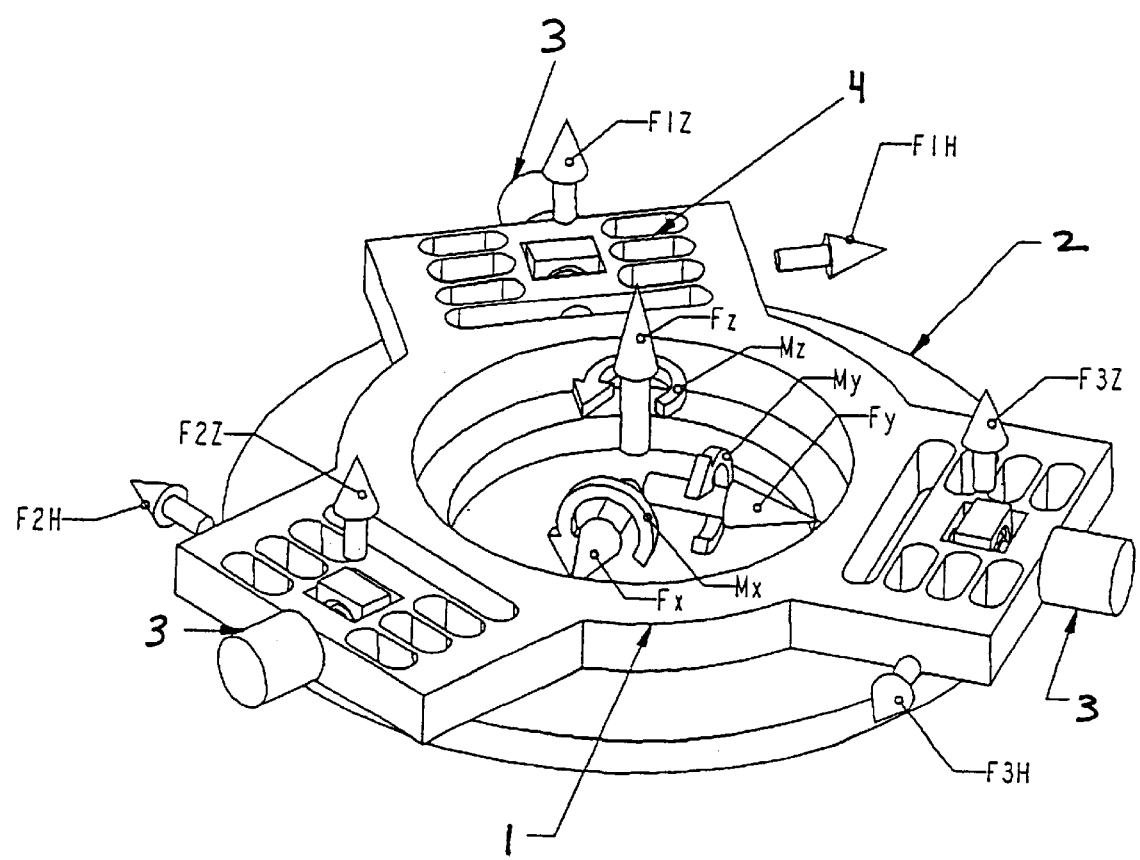
FIG. 1 is a perspective view of an improved high-payload six-axis load sensor.

FIG. 1 illustrates an improved high-payload six-axis load sensor. In the preferred embodiment, three commercially available two-axis shear-pin load transducers 3, as disclosed in Alexander Yorgiadis, *The Shear-Pin Force Transducer*, Measurement & Control, October 1986, at 173–178, incorporated herein by reference, are symmetrically and radially mounted between input table 1 and base plate 2. The shear-pin load transducers 3 are sensitive to shear forces in two axes perpendicular to the centerline of the shear-pin load transducer 3 and produce electrical signals proportional to the forces in the two sensitive directions. Thus, the shear-pin load transducers 3 measure reaction forces between the input table 1 and the base plate 2, that are produced by forces or torques applied to the input table 1.

Since each shear-pin load tranducer 3 cannot measure axial forces along its centerline, flexures 4 are provided that are extremely inelastic in the sensitive directions perpendicular to the centerline and elastic in the direction parallel to the centerline. In the preferred embodiment, each flexure 4 corresponds to a particular shear-pin load transducer 3. Flexures 4 are formed by cutting away strips of the table 1 perpendicular to the centerline of the particular shear-pin load transducer. As a result, the flexures 4 minimize unmeasured axial loading on each shear-pin load transducer.

Figure 2:
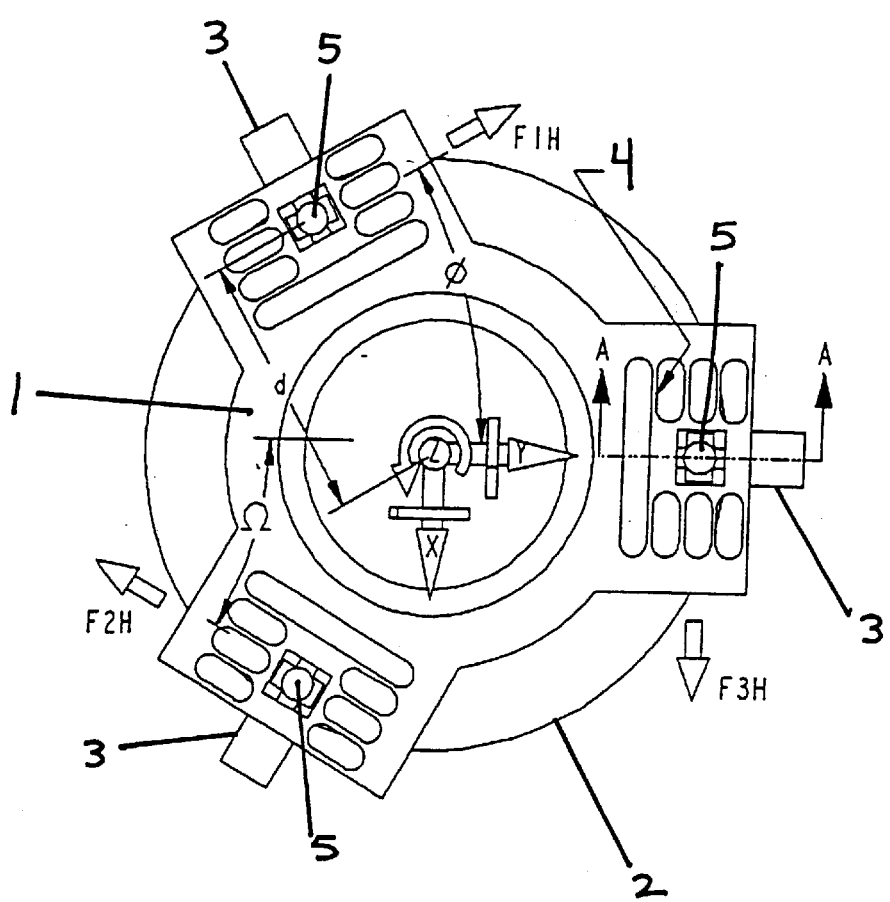
FIG. 2 is a top view of an improved high-payload six-axis load sensor.

FIG. 2 is a top view of an improved high-payload six-axis load sensor. Specifically, FIG. 2 illustrates spherical bearings 5. Spherical bearings 5 are included with each shear-pin load transducer 3 to reduce moment loads experienced by each shear-pin load transducer 3. In the preferred embodiment, each spherical bearing 5 has a cylindrical passage formed therethrough. Moreover, each spherical bearing 5 is embedded in table 1 so that the spherical bearing 5 can receive a shear-pin load transducer 3 when mounting the shear-pin load transducer 3 to table 1. In this way, each spherical bearing 5 can envelop a length of a shear-pin load transducer 3.

FIG. 2 further illustrates the radially symmetric arrangement of the shear-pin load transducers 3 about the table 1. Each shear-pin load transducer 3 is mounted so that it is supported at each end with the load application at its center. In particular, the table 1 forms the end supports while the base 2 is attached to the center. Each shear-pin load transducer 3 is positioned a distance d from the center of the base 2.

Moreover, in the preferred embodiment, a first shear-pin load transducer 3 is positioned so that its directional line of maximum sensitivity and the centerline of an adjacent second shear-pin load transducer 3 form a non-zero angle $\Omega$. Furthermore, in the preferred embodiment, the remaining shear-pin load transducer 3 is positioned so that its directional line of maximum sensitivity and the centerline of the adjacent second shear-pin load transducer 3 form a non-zero angle $\phi$. Notwithstanding, in alternate embodiments, it is possible to position each shear-pin load transducer asymmetrically, so long as angles $\Omega$ and $\phi$, and distance d remain non-zero.

Figure 3:
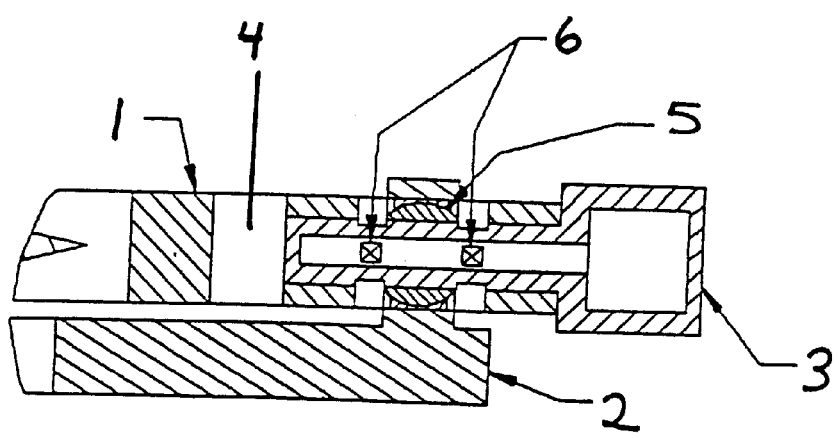
FIG. 3 is a side view of a two-axis shear-pin load transducer mounted to a force table taken along the section A—A of FIG. 2.

FIG. 3 is a side view of a two-axis shear-pin load transducer 3 having strain gauges 6 attached thereon, mounted to a force table 1 taken along the section A—A of FIG. 2. From the illustration, one skilled in the art will recognize the removeable mounting of shear-pin load transducer 3 to table 1. Specifically, each shear-pin load transducer 3 can be securely, but removeably, inserted into a side wall of table 1 through a spherical bearing 5 until the tip of the shear-pin load transducer reaches a terminus before the wall of flexure 4. Subsequently, a simple key is installed that prevents rotary or axial motion of the shear-pin load transducer 3 once in place. In this configuration, forces $F_x$, $F_y$, and $F_z$ and moments $M_x$, $M_y$, and $M_z$, experienced by table 1 can be computed from the forces measured at the shear-pin load transducer 3. In particular, forces $F_x$, $F_y$, and $F_z$ and moments $M_x$, $M_y$, and $M_z$ can be calculated using the following algebraic formulas:

$$F_x = F3H - F2H^* \sin \Omega - F1H^* \sin \phi$$

$$F_y = F1H^* \cos \phi - F2H^* \cos \Omega$$

$$F_z = F1Z + F2Z + F3Z$$

$$M_x = -F1Z^* d^* \sin \phi - F2Z^* d^* \sin \Omega + F3Z^* d$$

$$M_y = F1Z^* d^* \cos \phi - F2Z^* d^* \cos \Omega$$

$$M_z = d^*(-F1H - F2H - F3H)$$

where F1H is the horizontal force component experienced by a first shear-pin load transducer 3, F2H is the horizontal force component experienced by a second shear-pin load transducer 3, and F3H is the horizontal force component experienced by a third shear-pin load transducer 3. In addition, F1Z is the vertical force component experienced by the first shear-pin load transducer 3, F2Z is the vertical force component experienced by the second shear-pin load transducer 3, and F3Z is the vertical force component experienced by the third shear-pin load transducer 3.

Notwithstanding, while each shear-pin load transducer 3 is sensitive to forces in two orthogonal axes, the electrical output produced is not linearly related to those forces. Also, significant cross-coupling effects between the horizontal and vertical force components exist. Thus, the preferred embodiment includes a method to correctly compensate for these non-linearities and cross-coupling effects. Moreover, the inventive method improves the accuracy of measured forces and torques applied to table 1.

Specifically, output voltages from each strain gauge 6 on shear-pin load transducer 3 can be read by a circuit including a signal amplifier and conditioner and an analog-to-digital converter for converting the analog voltage to a digital signal, readable by a computer. Subsequently, using the following method, the digital computer can map the output voltages of the strain gauges 6 to the three load forces and three load moments. The method includes four calculation steps:

First, the computer can convert the output voltage from each strain gauge 6 to a gauge voltage. To obtain an x-direction voltage from each shear-pin load transducer 3, the computer solves the following equation:

$$\Delta E_{xi} = s_{xi} * g * c * (V_{xi}^{meas} - V_{xi0}^{meas})$$

where $s_{xi}$ is a scale factor in the x-direction for shear-pin load transducer i, g is a gain factor of a signal conditioner, c is a constant factor, $V_{xi}^{meas}$ is the measured voltage for force in the x-direction for shear-pin load transducer i, and $V_{xi0}^{meas}$ is the initial unloaded voltage for the force in the x-direction for shear-pin load transducer i. In particular, the scale factor is an estimated gain obtained by means of the commonly known mathematical technique, least-squares fit. The least-squares fit can be calculated for various known loads applied to the sensor, by recording the measured voltage at each gauge 6. The gain factor takes into account the gauge factor of the strain gauges 6 and the conditioning electronics conversion gains. In practice, the gain factor can be obtained from the manufacturer of each component. Also, constant factor c is typically set to one.

Similarly to obtain a z-direction voltage from each shear-pin load transducer 3, the computer solves the following equation:

$$\Delta E_{zi} = s_{zi} * g * c * (V_{zi}^{meas} - V_{zi0}^{meas})$$

where $s_{zi}$ is a scale factor in the z-direction for shear-pin load transducer i, g is a gain factor of a signal conditioner, c is a constant factor, $V_{zi}^{meas}$ is the measured voltage for force in the z-direction for shear-pin load transducer i, and $V_{zi0}^{meas}$ is the initial unloaded voltage for the force in the z-direction for shear-pin load transducer i. As before, the scale factor is an estimated gain obtained by means of a least-squares fit. The least-squares fit can be calculated for various known loads applied to the sensor, by recording the measured voltage at each gauge 6. The gain factor takes into account the gauge factor of the strain gauges 6 and the conditioning electronics conversion gains. In practice, the gain factor can be obtained from the manufacturer of each component. Also, constant factor c is typically set to one.

Second, the computer can linearize the non-linear measured gauge voltages typical of shear-pin load transducers 3. Moreover, cross-talk between the axes for each shear-pin load transducer 3 can be removed by means of the least-squares fit technique by measuring known loads to each shear-pin load transducer 3 and recording the associated measured voltages of each shear-pin load transducer 3. This technique can estimate the gains $a_{i1}$, $a_{i2}$, $a_{i3}$, $a_{i4}$, $a_{i5}$, $b_{i1}$, $b_{i2}$, $b_{i3}$, $b_{i4}$ and $b_{i5}$ for each shear-pin load transducer 3. The computer can estimate the forces at each shear-pin load transducer 3 by means of the following matrix equation:

$$\begin{bmatrix} F''_{hi} \\ F''_{vi} \end{bmatrix} = \begin{bmatrix} a_{j1} & a_{j2} & a_{j3} & a_{j4} & a_{j5} \\ b_{j1} & b_{j2} & b_{j3} & b_{j4} & b_{j5} \end{bmatrix} \begin{bmatrix} \Delta E_{xi} \\ \Delta E_{zi} \\ \Delta E_{xi}^2 \\ \Delta E_{zi}^2 \\ \Delta E_{xi}^2 \Delta E_{zi}^2 \end{bmatrix}$$

where $F''_{vi}$ is the vertical force experienced by the particular shear-pin load transducer 3, and $F''_{hi}$ is the horizontal force experienced by the shear-pin load transducer 3. Finally, $\Delta E_{xi}$ and $\Delta E_{zi}$ are the x-direction and z-direction voltages, respectively, measured in the first calculation for each shear-pin load transducer. Thus, the computer can linearize the non-linear measured gauge voltages by performing a two-dimensional parabolic fit.

Third, the computer can remove the influences of how each shear-pin load transducer 3 has been mounted in the table 1. Specifically, the computer can adjust for the tilt and rotation of each shear-pin load transducer 3 by solving the equation:

$$\begin{bmatrix} F'_h \\ F'_v \end{bmatrix} = \begin{bmatrix} \cos\theta_r & \sin\theta_r \\ -\sin\theta_r & \cos\theta_r \end{bmatrix} \begin{bmatrix} F''_h \\ F''_v \end{bmatrix}$$

where $\theta_r$ is the rotational angle of the particular shear-pin load transducer 3, $F''_v$ is the vertical force experienced by the particular shear-pin load transducer 3, and $F''_h$ is the horizontal force experienced by the shear-pin load transducer 3, both $F''_v$ and $F''_h$ having been calculated in the second step, and $F'_h$ and $F'_v$ are resulting, intermediate forces subsequently used in the equation:

$$\begin{bmatrix} F_h \\ F_v \end{bmatrix} = \begin{bmatrix} 1 & 0 \\ 0 & \cos\theta_t \end{bmatrix} \begin{bmatrix} F'_h \\ F'_v \end{bmatrix},$$

where $\theta_t$ is the tilt angle of the particular shear-pin load transducer 3, and $F_h$ and $F_v$ are resulting, intermediate forces used to calculate the forces and moments experienced by the inventive sensor. Likewise, $\theta_r$ and $\theta_t$ include estimated gains obtained by a least-squares mathematical technique for gauge voltages measured when each gauge 6 has various known loads applied thereto.

Finally, the computer can convert the measured, linearized and modified shear-pin load transducer forces to the applied load forces and moments at the sensor frame of reference by solving the following matrix equation:

where $p_{sx}$, $p_{sy}$ and $p_{sz}$ are x, y, and z coordinates, respectively, of the inventive sensor with respect to the first shear-pin force transducer 3, $p_{1x}$, $p_{1y}$ and $p_{1z}$ are x, y, and z coordinates, respectively, of a second shear-pin force transducer 3 with respect to the first shear-pin force transducer 3, $p_{2x}$, $p_{2y}$ and $p_{2z}$ are x, y, and z coordinates, respectively, of a third shear-pin force transducer 3 with respect to the first shear-pin force transducer 3, $F_{h0}$ and $F_{v0}$ are a modified horizontal force component and a modified vertical force component of the first shear-pin force transducer 3 computed in the third calculation, $F_{h1}$ and $F_{v1}$ are a modified horizontal force component and a modified vertical force component of the second shear-pin force transducer 3 also formed in the third calculation, and $F_{h2}$ and $F_{v2}$ are a modified horizontal force component and a modified vertical force component of the third shear-pin force transducer formed in the third calculation.

In consequence of the inventive arrangement and the corresponding inventive method, the improved high-payload six-axis load sensor offers several advantages over existing six-axis force/torque sensors in the prior art. First, the shear-pin load transducers 3 are easily replaceable. Second, the sensor is mechanically simple and inexpensive to fabricate. Third, each shear-pin load transducer 3 can be widely separated from each other shear-pin load transducer 3 which improves torque capacity. Fourth, the small diameter of each shear-pin load transducer 3 and the placement thereof in the same plane as the input table permits a low-profile design. Finally, shear-pin load transducers 3 are commercially available having a force capacity of over 100,000 lbs. and a torque capacity of over 100,000 ft-lbs. Thus, six-axis load sensors of very high capacities can be implemented using the inventive apparatus and method.

What is claimed is:

1. A repairable high-payload six-axis load sensor comprising:
   a table;
   a base;
   at least three two-axis force sensing units, said two-axis force sensing units each comprising:
   a shear-pin load transducer removably mounted between said table and said base for measuring two orthogonal reaction forces between said table and said base and a structure for minimizing unmeasured axial loading on said shear-pin load transducer by transmitting reaction forces in an unmeasured third orthogonal direction to at least one of the other of said sensing units, said reaction forces produced by an applied load, each said shear-pin load transducer producing an electrical signal proportional to said reaction forces; and, $$\begin{bmatrix} F_{sx} \\ F_{sy} \\ F_{sz} \\ M_{sx} \\ M_{sy} \\ M_{sz} \end{bmatrix} = \begin{bmatrix} -\cos\theta_0 & 0 & -\cos\theta_1 & 0 & -\cos\theta_2 & 0 \\ -\sin\theta_0 & 0 & -\sin\theta_1 & 0 & -\sin\theta_2 & 0 \\ 0 & -1 & 0 & -1 & 0 & -1 \\ -p_{sz}\sin\theta_0 & p_{sy} & -(p_{sz}-p_{1z})\sin\theta_1 & p_{sy}-p_{1y} & -(p_{sz}-p_{2z})\sin\theta_2 & p_{sy}-p_{2y} \\ p_{sz}\cos\theta_0 & -p_{sx} & (p_{sz}-p_{1z})\cos\theta_1 & -p_{sx}+p_{1x} & (p_{sz}-p_{2z})\cos\theta_2 & -p_{sx}+p_{2x} \\ -p_{sy}\cos\theta_0+p_{sx}\sin\theta_0 & 0 & -(p_{sy}-p_{1y})\cos\theta_1+(p_{sx}-p_{1x})\sin\theta_1 & 0 & -(p_{sy}-p_{2y})\cos\theta_2+(p_{sx}-p_{2x})\sin\theta_2 & 0 \end{bmatrix} \begin{bmatrix} F_{h0} \\ F_{v0} \\ F_{h1} \\ F_{v1} \\ F_{h2} \\ F_{v2} \end{bmatrix}$$

computing means for receiving said proportional electrical signals and computing three orthogonal forces and three orthogonal torques produced by said applied load corresponding to said proportional electrical signals.

2. The sensor according to claim 1, wherein said structure for transmitting reaction forces comprises at least one flexure, said flexure having at least one feature oriented perpendicular to an axis of minimum sensitivity characteristic of said removably mounted shear-pin load transducers.

3. The sensor according to claim 1, wherein at least one of said shear-pin load transducers includes a bearing embedded in said table, said bearing defining a passage, each said bearing enclosing a length of said shear-pin load transducer inserted through said passage of said bearing when removably mounted in said table, whereby said bearing can reduce moment loads applied to said shear-pin load transducer.

4. The sensor according to claim 1, wherein each said shear-pin load transducer is responsive to shear forces imparted along two axes perpendicular to an axis of minimum sensitivity characteristic of said transducer.

5. The sensor according to claim 1, wherein said at least three shear-pin load transducers are symmetrically mounted about said table.

6. The sensor according to claim 1, wherein said table is a low-profile disc having each of said at least three shear-pin load transducers radially positioned apart from each other about a circumference of said disc.

7. The sensor according to claim 1, wherein said computing means further comprises means for expressing said computed load in terms of a three-dimensional XYZ Cartesian coordinate system.

8. A method for computing an applied load in a repairable high-payload six-axis load sensor comprising the steps of:

providing at least three removably mounted shear-pin load transducers, said shear-pin load transducers each having at least one flexure with features oriented perpendicular to an axis of minimum sensitivity characteristic of respective ones of said removably mounted shear-pin load transducers;

measuring a non-linear output voltage from a strain gauge attached to each of said shear-pin load transducers contained in said high-payload six-axis load sensor;

transforming each said non-linear output voltage to a non-linear gauge voltage;

for each of said shear-pin load transducers, linearizing said measured non-linear voltages, forming a vertical force component and a horizontal force component for each of said three shear-pin load transducers;

for each vertical force component and horizontal force component formed from a measured non-linear voltage, removing pin mounting bias from said vertical force component and said horizontal force component, said removing step forming a modified vertical force component and a modified horizontal force component; and, computing an applied load from said modified vertical force components and said modified pin horizontal force components.

9. The method according to claim 8, wherein said transforming step comprises the step of converting each said non-linear output voltage to a corresponding non-linear gauge voltage by solving an equation $\Delta E = s \ast g \ast c \ast \Delta V$ where $\Delta V$ is a non-linear output voltage produced by a strain gauge attached to a shear-pin load transducer in response to a load applied thereto, s is a scale factor corresponding to said shear-pin transducer, g is a gain factor corresponding to an electronic amplifier used to measure said non-linear output voltage, c is a constant factor, and $\Delta E$ is said non-linear gauge voltage.

10. The method according to claim 8, wherein said linearizing step comprises the steps of:

successively repositioning each said shear-pin load transducer in a different fixed orientation;

for each said different fixed orientation, successively loading each said shear-pin load transducer with different fixed loads;

deriving a calibration constant for each said different fixed load imparted upon said shear-pin load transducer when in each said different fixed orientation; and, computing a vertical force component and a horizontal force component by solving an equation where $a_j$ and $b_j$ are said calibration constants, $\Delta E_x$ and $\Delta E_z$ are scalar x-direction and z-direction non-linear gauge voltage components of a vector $\Delta E$ representing said transformed non-linear gauge, $F''_v$ is said vertical force component and $F''_h$ is said horizontal force component.

11. The method according to claim 8, wherein said removing step comprises the steps of:

measuring a tilt angle $\theta_t$ for a shear-pin load transducer;

measuring a rotational angle $\theta_r$ for said shear-pin load transducer;

calculating first intermediate forces $F'_h$ and $F'_v$ for said shear-pin load transducer using the equation $$\begin{bmatrix} F'_h \\ F'_v \end{bmatrix} = \begin{bmatrix} \cos\theta_r & \sin\theta_r \\ -\sin\theta_r & \cos\theta_r \end{bmatrix} \begin{bmatrix} F''_h \\ F''_v \end{bmatrix}$$

where $F''_v$ is said vertical force component formed in said linearizing step, and $F''_h$ is said horizontal force component formed in said linearizing step; and, further calculating second intermediate forces $F_h$ and $F_v$ for said shear-pin load transducer using the equation $$\begin{bmatrix} F_h \\ F_v \end{bmatrix} = \begin{bmatrix} 1 & 0 \\ 0 & \cos\theta_t \end{bmatrix} \begin{bmatrix} F'_h \\ F'_v \end{bmatrix}.$$

12. The method according to claim 8, wherein said computing step comprises the steps of:

measuring offset angles $\theta_1$, $\theta_2$, and $\theta_3$ corresponding to each of said shear-pin load transducers;

measuring x, y, and z coordinates of said high-payload six-axis load sensor with respect to a first shear-pin load transducer;

measuring x, y, and z coordinates of a second shear-pin load transducer with respect to said first shear-pin load transducer;

measuring x, y, and z coordinates of a third shear-pin load transducer with respect to said first shear-pin load transducer; and, calculating an applied load vector comprising three orthogonal forces, $F_{sx}$, $F_{sy}$, and $F_{sz}$, and three orthogonal moments $M_{sx}$, $M_{sy}$, and $M_{sz}$ using the equation $$= \begin{bmatrix} -\cos\theta_0 & 0 & -\cos\theta_1 & 0 & -\cos\theta_2 & 0 \\ -\sin\theta_0 & 0 & -\sin\theta_1 & 0 & -\sin\theta_2 & 0 \\ 0 & -1 & 0 & -1 & 0 & -1 \\ -p_{sz}\sin\theta_0 & p_{sy} & -(p_{sz}-p_{1z})\sin\theta_1 & p_{sy}-p_{1y} & -(p_{sz}-p_{2z})\sin\theta_2 & p_{sy}-p_{2y} \\ p_{sz}\cos\theta_0 & -p_{sx} & (p_{sz}-p_{1z})\cos\theta_1 & -p_{sx}+p_{1x} & (p_{sz}-p_{2z})\cos\theta_2 & -p_{sx}+p_{2x} \\ -p_{sy}\cos\theta_0+p_{sx}\sin\theta_0 & 0 & -(p_{sy}-p_{1y})\cos\theta_1+(p_{sx}-p_{1x})\sin\theta_1 & 0 & -(p_{sy}-p_{2y})\cos\theta_2+(p_{sx}-p_{2x})\sin\theta_2 & 0 \end{bmatrix}[$$

where $p_{sx}$, $p_{sy}$ and $p_{sz}$ are x, y, and z coordinates, respectively, of said high-payload six-axis load sensor with respect to said first shear-pin load transducer, $p_{1x}$, $p_{1y}$ and $p_{1z}$ are x, y, and z coordinates, respectively, of said second shear-pin load transducer with respect to said first shear-pin load transducer, $P_{2x}$, $P_{2y}$ and $P_{2z}$ are x, y, and z coordinates, respectively, of said third shear-pin load transducer with respect to said first shear-pin load transducer, $F_{h0}$ and $F_{v0}$ are a modified horizontal force component and a modified vertical force component, respectively, of said first shear-pin load transducer formed in said removing step, $F_{h1}$ and $F_{v1}$ are a modified horizontal force component and a modified vertical force component of said second shear-pin load transducer formed in said removing step, and $F_{h2}$ and $F_{v2}$ are a modified horizontal force component and a modified vertical force component of said third shear-pin load transducer formed in said removing step.

13. The method according to claim 8, wherein said measuring step comprises the step of analog-to-digital converting said non-linear output voltage from said strain gauge in each said shear-pin load transducer contained in said repairable high-payload six-axis load sensor.

14. The method according to claim 13, wherein said transforming step comprises the steps of:

programming a computer to solve a first equation $\Delta E = s*g*c*\Delta V$;

entering in said computer predetermined values for variables s, g and c contained in said first equation;

providing to said computer as variable $\Delta V$ said non-linear voltage measured in said analog-to-digital converting step; and, solving said first equation in said computer to determine non-linear gauge voltage $\Delta E$.

15. The method according to claim 14, wherein said linearizing step comprises the steps of:

programming said computer to solve a second equation $$\begin{bmatrix} F''_h \\ F''_v \end{bmatrix} = \begin{bmatrix} a_j \\ b_j \end{bmatrix} \begin{bmatrix} \Delta E_x \\ \Delta E_z \\ \Delta E_x^2 \\ \Delta E_z^2 \\ \Delta E_x^2 \Delta E_z^2 \end{bmatrix};$$

entering in said computer predetermined values for variables $a_j$ and $b_j$;

providing to said computer as variables $\Delta E_x$ and $\Delta E_z$ said non-linear gauge voltages measured in said analog-to-digital converting step; and, solving said second equation in said computer to determine said vertical force component and said horizontal force component, $F''_h$ and $F''_v$, respectively.

16. The method according to claim 15, wherein said removing step comprises the steps of:

programming a computer to solve third and fourth equations $$\begin{bmatrix} F'_h \\ F'_v \end{bmatrix} = \begin{bmatrix} \cos\theta_r & \sin\theta_r \\ -\sin\theta_r & \cos\theta_r \end{bmatrix} \begin{bmatrix} F''_h \\ F''_v \end{bmatrix}, \text{ and}$$

$$\begin{bmatrix} F_h \\ F_v \end{bmatrix} = \begin{bmatrix} 1 & 0 \\ 0 & \cos\theta_t \end{bmatrix} \begin{bmatrix} F'_h \\ F'_v \end{bmatrix};$$

entering in said computer predetermined values for variables $\theta_h$ contained in said third equation, and $\theta_t$ contained in said fourth equation;

providing to said computer as variables $F''_h$ and $F''_v$, said vertical force component and said horizontal force component computed in said linearizing step; and, successively solving said third and fourth equations in said computer to determine said modified vertical force component $F_v$ and said modified horizontal force component $F_h$.

17. The method according to claim 16, wherein said computing step comprises the steps of:

programming said computer to solve a fifth equation $$\begin{bmatrix} F_{sx} \\ F_{sy} \\ F_{sz} \\ M_{sx} \\ M_{sy} \\ M_{sz} \end{bmatrix} = \begin{bmatrix} -\cos\theta_0 & 0 & -\cos\theta_1 & 0 & -\cos\theta_2 & 0 \\ -\sin\theta_0 & 0 & -\sin\theta_1 & 0 & -\sin\theta_2 & 0 \\ 0 & -1 & 0 & -1 & 0 & -1 \\ -p_{sz}\sin\theta_0 & p_{sy} & -(p_{sz}-p_{1z})\sin\theta_1 & p_{sy}-p_{1y} & -(p_{sz}-p_{2z})\sin\theta_2 & p_{sy}-p_{2y} \\ p_{sz}\cos\theta_0 & -p_{sx} & (p_{sz}-p_{1z})\cos\theta_1 & -p_{sx}-p_{1x} & (p_{sz}+p_{2z})\cos\theta_2 & -p_{sx}+p_{2x} \\ -p_{sy}\cos\theta_0+p_{sx}\sin\theta_0 & 0 & -(p_{sy}-p_{1y})\cos\theta_1+(p_{sx}-p_{1x})\sin\theta_1 & 0 & -(p_{sy}-p_{2y})\cos\theta_2+(p_{sx}-p_{2x})\sin\theta_2 & 0 \end{bmatrix} \begin{bmatrix} F_{h0} \\ F_{v0} \\ F_{h1} \\ F_{v1} \\ F_{h2} \\ F_{v2} \end{bmatrix};$$

entering in said computer predetermined values for variables $\theta_1$, $\theta_2$, $\theta_3$, $p_{sx}$, $p_{sy}$, $p_{sz}$, $p_{1x}$, $p_{1y}$, $p_{1z}$, $p_{2x}$, $p_{2y}$, and $p_{2z}$;

first providing to said computer as variables $F_{v1}$ and $F_{h1}$, said modified vertical force component and said modified horizontal force component of a first shear-pin load transducer determined in said removing step;

second providing to said computer as variables $F_{v2}$ and $F_{h2}$, said modified vertical force component and said modified horizontal force component of a second shear-pin load transducer determined in said removing step;

third providing to said computer as variables $F_{v3}$ and $F_{h3}$, said modified vertical force component and said modified horizontal force component of a third shear-pin load transducer determined in said removing step; and, solving said fifth equation in said computer to determine said applied load comprising orthogonal forces $F_{sx}$, $F_{sy}$, and $F_{sz}$, and three orthogonal moments $M_{sx}$, $M_{sy}$, and $M_{sz}$.

18. A method for operating a repairable six-axis load sensor system, comprising the steps of:

providing a table, a base and at least three two-axis force sensing units, said two-axis force sensing units each including a shear-pin load transducer removably mounted between said table and said base for measuring two orthogonal reaction forces between said table and said base and a structure for minimizing unmeasured axial loading on said shear-pin load transducer by transmitting reaction forces in an unmeasured third orthogonal direction to at least one of the other of said sensing units, said reaction forces produced by an applied load, each said shear-pin load transducer producing an electrical signal proportional to said reaction forces;

removing any of said shear-pin transducers from said system; replacing said removed shear-pin transducer with a replacement shear-pin transducer in said system, and returning said system to operation after said replacing step.

19. The method of claim 18, wherein said structure for transmitting reaction forces comprises at least one flexure, said flexure having at least one feature oriented perpendicular to an axis of minimum sensitivity characteristic of said removably mounted shear-pin load transducers.

20. The method of claim 18, wherein said returning step can be implemented without recalibrating said system.

21. A repairable high-payload six-axis load sensor comprising:

a table;

a base;

at least three two-axis force sensing units, said two-axis force sensing units each comprising:

a two-axis load transducer removably mounted between said table and said base for measuring two orthogonal reaction forces between said table and said base and a structure for minimizing unmeasured axial loading on said two-axis load transducer by transmitting reaction forces in an unmeasured third orthogonal direction to at least one of the other of said sensing units, said reaction forces produced by an applied load, each said two-axis load transducer producing an electrical signal proportional to said reaction forces; and, computing means for receiving said proportional electrical signals and computing three orthogonal forces and three orthogonal torques produced by said applied load corresponding to said proportional electrical signals.

22. A high-payload load sensor comprising:

a table;

a base;

at least two (2) two-axis force sensing units, said two-axis force sensing units each comprising:

a two-axis load transducer disposed between said table and said base for measuring two orthogonal reaction forces between said table and said base and a structure for minimizing unmeasured axial loading on said shear-pin load transducer by transmitting reaction forces in an unmeasured third orthogonal direction to the other of said sensing units, said reaction forces produced by an applied load, each said two-axis load transducer producing an electrical signal related to said reaction forces; and, computing means for receiving said electrical signals and computing forces and torques produced by said applied load corresponding to said electrical signals.

23. The sensor according to claim 22, wherein said two-axis load transducers are shear-pin load transducer and said structures for minimizing unmeasured axial loading comprise least one flexure.

* * * * *